F. W. SCHMIDT.
ELECTRIC RELAY.
APPLICATION FILED OCT. 19, 1914.

1,228,058.

Patented May 29, 1917.

WITNESSES

INVENTOR.
F. W. Schmidt
By Chamberlin & Henderich
ATTORNEYS

UNITED STATES PATENT OFFICE.

FREDERICK W. SCHMIDT, OF CHICAGO, ILLINOIS, ASSIGNOR, BY MESNE ASSIGNMENTS, TO TIME-SYSTEMS COMPANY, OF PORTLAND, MAINE, A CORPORATION OF MAINE.

ELECTRIC RELAY.

1,228,058.   Specification of Letters Patent.   Patented May 29, 1917.

Application filed October 19, 1914. Serial No. 867,296.

*To all whom it may concern:*

Be it known that I, FREDERICK W. SCHMIDT, a subject of the Emperor of Germany, residing at Chicago, county of Cook, State of Illinois, have invented a certain new and useful Improvement in Electric Relays, and declare the following to be a full, clear, and exact description of the same, such as will enable others skilled in the art to which it pertains to make and use the same, reference being had to the accompanying drawings, which form a part of this specification.

My invention has for its object to produce a simple and novel electro-magnetic relay in which the circuit is broken between mercury and mercury.

A further object of my invention is to produce a relay of the mercury type in which the change in circuit conditions is effected in a comparatively short interval without requiring the movement of any part through any considerable distance.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1:
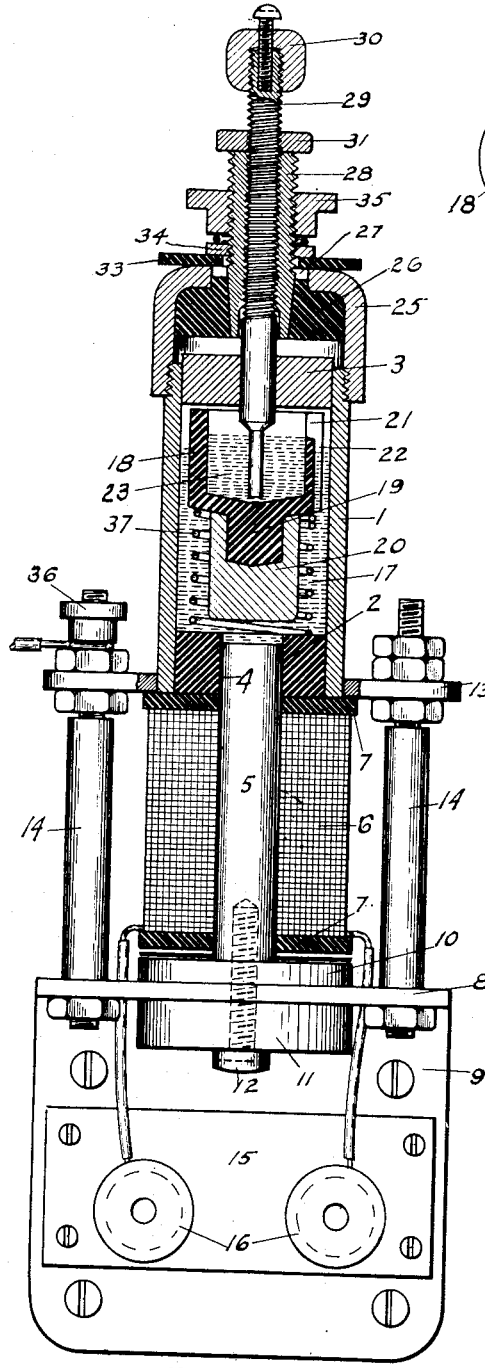
Figure 1 is a vertical axial section through a relay arranged in accordance with a preferred form of my invention.
Figure 3:
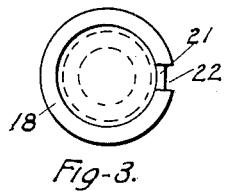
Fig. 3 is a top plan view of the float member of the relay.
Figure 2:
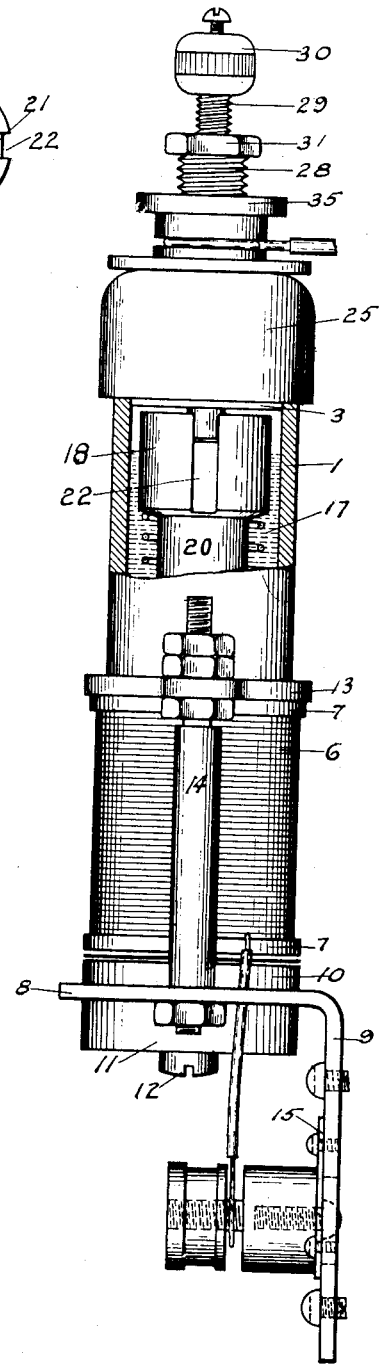
Fig. 2 is a side view of the relay, a portion of the wall of the mercury chamber being broken away.

Generally speaking, my invention consists in a chamber containing a mercury bath within which is a hollow float of insulating material having an outlet opening, also containing mercury; one terminal of the circuit to be controlled making electrical contact with the mercury in the float and the other terminal having electrical contact with the main body of mercury in the chamber; and an electro-magnet being provided for moving the float out of its normal position by attracting a piece of magnetic material carried by the float, and thus causing the two bodies of mercury to unite through the outlet opening in the float when the electro-magnet is energized. As soon as the electro-magnet is deënergized, the float returns to its normal position and breaks the continuity between the mercury in the cup and the main body of mercury in the chamber. By properly proportioning the parts, the making and breaking of the circuit may be accomplished without moving the float through a considerable angle, or, where the float is cup-shaped, without depressing it through a distance of more than one-thirty second of an inch or even one-sixty fourth of an inch.

Reference being had to the specific structure disclosed in the drawing, 1 represents a tube of steel the lower end of which is closed by a plug, 2, of insulating material, preferably fiber, driven into the same, while the upper end is closed by a stopper, 3, made of cork. The plug 2 has an axial opening, 4, into which is driven the upper end of the core, 5, of an electro-magnet. The winding, 6, of the electro-magnet lies between heavy washers, 7, of fiber or other insulating material, one engaging with the bottom edge of the tube 1 and the other surrounding the lower end of the core. The electro-magnet is mounted at its lower end upon a suitable L-shaped bracket having a horizontal portion, 8, and a vertical portion, 9. Between the member 8 and the lower end of the electro-magnet is a heavy iron disk, 10, and on the under side of the member 8, in axial alinement with the electro-magnet and the disk 10 is the second disk, 11. A screw, 12, passing upwardly through the disk 11, the member 8 of the bracket and the disk 10 into the lower end of the core of the electro-magnet, serves to secure the electro-magnet, the disks and the bracket rigidly together. The disks 10 and 11 serve to space the core 5 from the horizontal portion 8 of the L-bracket and form an enlarged bearing for the screw 12 so that the core 5 is rigidly and firmly held in place. In order that the support of the parts carried on top of the electro-magnet need not be borne entirely by the means for fastening the magnet to the bracket, I have secured upon the lower end of the tube 1, preferably by a driving fit, a horizontal metal plate, 13, which is connected to the horizontal member of the bracket by upright posts, 14, lying on opposite sides of the electro-magnet. On the front side of the vertical member of the bracket is a plate, 15, of insulating material on which are carried suitable binding posts, 16, constituting the terminals of the electro-magnet.

Within the tube 1 is a body of mercury, 17, on which lies a cup shaped float, 18, of fiber or other insulating material, the float having a stem, 19, projecting down from the bottom thereof on which stem is driven an armature, 20, of magnetic material. The cup has a vertical slot, 21, extending downwardly for some distance from the upper edge thereof and, if desired, the exterior of the cup may be grooved or recessed in the vertical direction, as indicated at 22, from the lower portion of this slot to the bottom of the cup. Within the cup is a body of mercury, 23, which, of course, extends no higher than the lowermost point of the slot 21; the parts being so proportioned that the lowermost point of the slot 21 lies sufficient distance above the upper surface of the main mercury bath when the float is simply resting in the mercury to separate the bodies of mercury 17 and 23.

On the upper end of the tube 1 is screwed a cap, 25, within which is driven a plug of insulating material, 26. The cap has in the top an axial opening, 27, of considerable diameter, and a portion of the plug 26 extends upwardly into this opening. An elongated metal plug or post, 28, screw threaded at its upper end, is driven down into the plug 26 through the top of the cap, being thus supported by the cap but having no electrical connection therewith. Extending down through the post 28 is a rod, 29, screw threaded throughout that part which engages with the post, so that the rod may be raised and lowered. The lower end of the rod extends down into the mercury contained within the cup. The rod 29 is preferably screw threaded from its upper end downwardly, a section below the screw threaded portion being of unimpaired cross section, so that the rod must be screwed into the post from below and cannot, after the parts are assembled, be screwed up far enough to carry its lower end out of the mercury bath. On the upper end of the rod 29 is a knurled button, 30, by which it may be turned either to adjust it nicely or else to lower the rod sufficiently to press the cup down into the mercury until the mercury in the cup contacts with the main bath; this latter adjustment being only for the purpose of making a permanent closure of the circuit in the mercury and may, if desired, be used to adjust the position of the lower end of the slot 21 with respect to the body of mercury 17, whereby the movement of the float 18 may be regulated and limited. A suitable lock nut, 31, may be placed on the rod 29 at a point above the post, in order to lock the rod in any adjusted position.

On the post 28, just above the cap 25, is a large washer, 33, of insulating material, held in place by a nut, 34, screwed on the post. A second nut, 35, arranged on the post 28 above the nut 34, and a nut, 36, on the upper ends of one of the posts 14, serve to fasten the wires which the mercury switch is intended to connect and disconnect.

It will be seen that the post 14 which serves as one of the terminals of the main circuit to be controlled, has a permanent electrical connection with the main mercury bath, 17, while the post 28 which serves as the other terminal of the circuit to be controlled, has a permanent electrical connection with the mercury contained in the cup shaped float; and that there is no electrical connection between these two posts unless the float is depressed far enough to permit the mercury of the main bath to flow through the slot 21 in the cup and unite with the mercury in the cup. Normally, when the magnet is deënergized, the float rides high enough to keep the lower end of the slot 21 at a safe distance above the level of the main mercury bath; but, when the magnet is energized, it attracts the armature on the lower end of the float, overcoming the buoyancy of the float and causing it to sink until a union between the two bodies of mercury is effected. When the electro-magnet is deënergized, the buoyancy of the float causes it to rise and break the circuit by again completely separating the two bodies of mercury. As heretofore explained, the entire vertical movement of the float may be very small, so that there is instantaneous response both upon energizing and upon deënergizing the electro-magnet.

If desired, a spring, 37, may be placed beneath the float, this spring being placed under tension when the float is depressed, and insuring a quick rise of the float, and consequently a quick breaking of the circuit, when the electro-magnet is deënergized.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In a relay, the combination with a tube, of a closure at one end thereof, an electromagnetic coil disposed below said closure and insulated therefrom, a core for said coil extending therethrough and into the closure aforesaid thereby having access to the interior of said tube, a float of insulating material located in said tube and provided with a projection on its under side, and an armature of magnetic material secured to said projection for coöperation with the core aforesaid.

2. The combination with a tube having one end thereof closed by an apertured plug, of an electro-magnetic coil alined with said tube and insulated therefrom, a core in said coil projecting into the aperture of said plug and having access to the interior of said tube, a floating cup within said tube, and an armature for said core carried by the under side of said cup.

3. The combination with a tube having one end thereof closed by an apertured plug, of an electro-magnetic coil alined with said tube and insulated therefrom, a core in said coil projecting into the aperture of said plug and having access to the interior of said tube, a floating cup within said tube, an armature secured to the under side of said cup for coöperation with said core, and independent bodies of mercury within said cup and tube respectively adapted to establish electrical connection when the core attracts the armature aforesaid.

4. The combination with a tube, of an insulating closure in each end thereof, a rod adjustable through the closure of one end and extending into said tube, a core projecting through the remaining closure and having access to the interior of said tube, a coil surrounding said core, a float on the interior of said tube under the control of said coil and core and arranged to coöperate with the inner end of said rod, and mercury within the float and tube, adapted to establish a connection upon the attraction of the float by the core aforesaid.

5. In a relay, a metal tube, plugs of insulating material arranged in the ends of said tube, each of said plugs having an opening therethrough, an electro-magnet provided with a core fitting tightly within the opening in one of the plugs, a conducting rod extending into the tube through the other plug, a mercury bath in the tube, a cup-shaped float supported on said bath and surrounding the inner end of said rod, mercury in said cup-shaped float, a member of magnetic material secured to the lower end of the float, said float having an opening extending from the interior to the exterior thereof at such a height that normally the lowest point thereof lies above the level of the mercury in the tube a distance less than the distance between the effective lower end of the float and the effective bottom of the tube.

6. The combination with a tube, of an insulating closure in each end thereof, a rod adjustable through the closure of one end and extending into said tube, a core projecting through the remaining closure and having access to the interior of said tube, a coil surrounding said core, a float within said tube provided with a projection on the under side thereof, an armature mounted on said projection in alinement with the inner end of said core, a spring encircling said projection and armature to force the float toward the rod aforesaid, and independent bodies of conducting fluids in said float and said tube, adapted to intermingle and establishing a connection upon the attraction of the armature by said core.

7. In a relay, a metal tube closed at its lower end, a plug of insulating material arranged in the upper end of the tube, a rod of conducting material projecting axially through said plug into the interior of the tube, a mercury bath within the tube, a cup-shaped float resting in the bath and surrounding the lower end of said rod, mercury within said float, said float having an opening through the side at a point above the normal level of the mercury in the tube, a member of magnetic material secured to the lower end of the float, and an electro-magnet beneath the tube for attracting said member of magnetic material and depressing the float.

8. In a relay, a metal tube closed at the lower end, a cap screwed upon the upper end of the tube, the cap having an opening of considerable diameter through the center, a plug of insulating material fitting within the cap and extending into said opening, a post extending axially through said plug, a conducting rod screw threaded into said post and projecting down into the interior of said tube, a mercury bath in said tube, a cup-shaped float resting on said bath and surrounding the lower end of said rod, mercury in said cup to contact with said rod, a member of magnetic material on said float, and an electro-magnet beneath said tube for acting on said member of magnetic material and depressing the float.

9. The combination with a tube, of a magnet coöperating with one end thereof and insulated therefrom, the core of said magnet having access to the interior of said tube, a cup-shaped float within said tube, an armature for said magnet carried by said float, a rod at the opposite end of said tube and extending into said cup-shaped float, and separate means within the float and the tube, adapted to establish a connection with said rod when said magnet attracts its armature.

In testimony whereof, I sign this specification in the presence of two witnesses.

FREDERICK W. SCHMIDT.

Witnesses:
WM. F. FREUDENREICH,
RUTH E. ZETTERVALL.